Dec. 2, 1952 R. B. DOME 2,620,439
NOISE BALANCING CIRCUITS
Filed Nov. 5, 1947
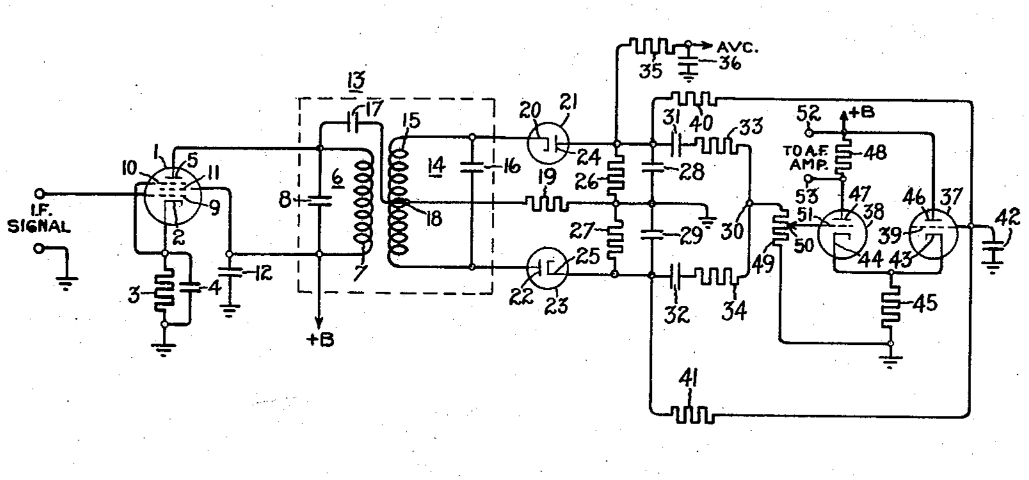
Inventor:
Robert B. Dome,
by Merton D. Morse
His Attorney.

Patented Dec. 2, 1952 2,620,439

UNITED STATES PATENT OFFICE 2,620,439

NOISE BALANCING CIRCUITS

Robert B. Dome, Geddes Township, Onondaga County, N. Y., assignor to General Electric Company, a corporation of New York Application November 5, 1947, Serial No. 784,156

3 Claims. (Cl. 250—20)

My invention relates to noise balancing circuits, and more particularly, to such circuits as may be incorporated in amplitude modulation radio receivers and the like.

In the case of an amplitude modulation radio receiver, it is desirable to minimize random noise interference from the sound output appearing at the loudspeaker. This noise interference takes the form of random amplitude modulation, and may be caused, for example, by automobile ignition systems and the like. It is a primary object of my invention to provide improved means for suppressing such noise interference in the output of an amplitude modulation radio receiver.

In general, there are two methods for accomplishing such noise suppression. The more recent developments have been directed to noise elimination by means of peak clippers or limiters. The other method is that wherein a sample of frequency spectrum containing both the desired signal and the undesired noise, and a sample of frequency spectrum containing only noise modulation, are balanced so that only the desired signal remains. It is a particular object of my invention to provide improved noise suppression means of the latter type.

It is a further object of my invention to provide improved means for detecting amplitude-modulated waves while substantially eliminating extraneous noise from the output.

The features of my invention which I believe to be novel are set forth with particularity in the appended claims. My invention itself, however, together with further objects and advantages thereof, may best be understood by reference to the following description taken in connection with the accompanying drawing, in which the single figure is a schematic circuit diagram of a portion of an amplitude modulation radio receiver which suitably embodies my invention.

Referring to the drawing, an electron discharge device 1, such as a high-vacuum pentode for example, serves as an amplifier of intermediate frequency signals. The cathode 2 of device 1 is grounded through the customary cathode bias resistor 3 and parallel bypass condenser 4. The anode 5 of device 1 is connected to a suitable source of direct operating potential +B through a parallel resonant circuit 6 comprising an inductance 7 and a capacitance 8. A suitable source of amplitude-modulated intermediate frequency signal voltage, which may, for example, comprise the converter-mixer stage of a superheterodyne receiver (not shown), is connected to the control grid 9 of device 1. The suppressor grid 10 is directly connected to the cathode 2 in the customary manner, and the screen grid 11 is connected to the source of direct energizing voltage +B; the conventional screen bypass condenser 12 is also provided.

A frequency discriminating transformer or discriminator transformer 13 is provided, the primary circuit of which comprises the parallel resonant circuit 6 in the anode circuit of the intermediate frequency amplifier 1. The discriminator transformer 13 also comprises a secondary parallel resonant circuit 14 comprising an inductance 15 and a capacitance 16. A coupling condenser 17 is connected between the anode 5 of device 1 and a center tap 18 on the secondary inductance 15, which tap is grounded through a resistance 19. The secondary parallel resonant circuit 14 is connected in series between the cathode 20 of one diode rectifier 21 and the anode 22 of another diode rectifier 23. The anode 24 of the first diode 21 and the cathode 25 of the second diode 23 are connected to ground through load resistances 26, 27, respectively. The load resistances 26, 27 are bypassed for high frequencies by respective condensers 28, 29. The detected signals appearing across the load resistors 26, 27 are combined in parallel by connecting the anode 24 of diode 21 and the cathode 25 of diode 23 to a common terminal point 30 through respective audio frequency coupling condensers 31, 32 and resistances 33, 34.

Improved balance may be obtained by replacing the coupling resistances 33, 34 with a single resistance potentiometer having a variable tap, not shown. In this modification, resistance 49 is connected between the variable tap and ground. In this manner, the output may be balanced independently of the manufacturing tolerances normally encountered in separate resistances. Audio frequency output voltage appears across resistance 49 as before.

It will be seen that the portion of the circuit thus far described is essentially that of an intermediate frequency amplifier and a balanced discriminator such as might be employed in a frequency modulation radio receiver. As is well-known in the art, such a balanced discriminator circuit has a substantially linear detection characteristic throughout a fixed band of frequencies. In accordance with my invention, the balanced discriminator functions as an amplitude detector in an amplitude modulation receiver, and simultaneously operates to reduce random noise interference.

In operation, the receiver is tuned to a desired amplitude-modulated signal by tuning the local heterodyning oscillator (not shown) in conventional manner to produce a first predetermined intermediate frequency. The intermediate frequency channel is tuned to pass this predetermined frequency. However, this frequency is somewhat higher or, alternatively, lower than the resonant frequency of the secondary circuit 14 of the discriminator transformer 13. Thus the detectors 21, 23 are balanced at a second predetermined intermediate frequency which is equal to the resonant frequency of the secondary circuit 14, but which differs from the intermediate carrier frequency of the desired intelligence. As is well-known, amplitude-modulated signals of a carrier frequency equal to the balance frequency of the discriminator are balanced out by the detectors 21, 23; amplitude-modulated signals of a frequency not corresponding to the discriminator characteristic mid-frequency, but within the discriminator bandwidth, are detected unequally by the diodes 21, 23. Consequently, owing to the unbalance, the desired signals produce demodulated audio voltages in the discriminator output, while much of the undesired noise is eliminated from the output.

For example, let the secondary circuit 14 be tuned to a resonant frequency of 8.25 megacycles per second, and assume a bandwidth of 100 kilocycles per second. If the intermediate frequency signal is adjusted by means of the local oscillator to 8.29 megacycles per second, such a frequency being within the bandwidth of the secondary circuit 14, the signal is impressed on the discriminator characteristic at a point to one side of the balance point, and is consequently demodulated unequally by the diodes 21, 23. As a result, unequal detected audio-frequency signal voltages appear across the diode load resistances 26, 27, and the net voltage is transferred to terminal 30. Furthermore, any impulse noise, such as that produced by an automobile ignition system, for example, shock-excites the secondary circuit 14 at its own resonant frequency of 8.25 megacycles per second in the case of the example under consideration. This frequency, however, is the balance frequency of the detectors 21, 23. Consequently, substantially equal and oppositely polarized extraneous noise voltages appear across the load resistances 26, 27, and the net voltage is transferred as zero voltage to terminal 30. Furthermore, this noise balancing is obtained without the use of limiters or peak clippers, and improved fidelity of sound output is obtained.

As a further modification, automatic volume control voltage is supplied to the preceding tubes by connecting an audio frequency low pass filter, comprising a series resistance 35 and a shunt capacitance 36, to the anode 24 of diode 21 in the customary manner. A unidirectional voltage appears across the filter condenser 36, which voltage may be applied to the control grids of preceding intermediate frequency or radio frequency stages for control purposes.

In order always to insure tuning to the same side of the balance point, I provide an auxiliary circuit comprising two audio amplifier tubes 37, 38, respectively. The control grid 39 of tube 37 is connected to the anode 24 of diode 21 and to the cathode 25 of diode 23 through respective high resistances 40, 41. The control grid 39 of tube 37 is bypassed for audio frequencies by a condenser 42. The cathodes 43, 44 of tubes 37, 38 are connected directly together and utilize a common cathode bias resistance 45. The anodes 46, 47 of amplifier tubes 37, 38 are connected to a source of positive direct operating potential +B, a load resistance 48 being included in series in the case of the latter anode. The terminal point 30 is grounded through a resistance potentiometer 49, the movable tap 50 of which is connected to the control electrode 51 of amplifier tube 38.

In general, this auxiliary circuit functions always to insure tuning of the local oscillator so as to produce an intermediate frequency on the same side of the balance point of the balanced detector circuit. The direct components of voltages appearing across the load resistances 26, 27 are used to bias an audio amplifier tube beyond cutoff if the intermediate signal frequency is produced by tuning the local oscillator in the improper direction.

In particular, the direct voltages across the load resistances 26, 27 are parallel through the grid coupling resistances 40, 41, and are applied to the control electrode 39 of a tube 37. As long as the resultant grid voltage of tube 37 is sufficiently negative, tube 37 is biased beyond cutoff and anode current flows in the audio amplifier tube 38, audio-frequency output appearing across the load resistance 48. If, however, the signal is impressed on the balanced detector circuit in such a way that diode 23 receives the largest portion of signal voltage, the bias voltage applied to tube 37 is made more positive, and anode current flows in tube 37, rendering the audio amplifier tube 38 non-conductive by virtue of the common cathode bias potential developed across resistor 45. Hence, audio output appears between terminals 52, 53 across the amplifier load resistance 48 only when the local oscillator is tuned in such a manner as to apply the larger portion of the signal voltage to diode 21.

In actual tests made on this circuit, I have found a reduction in extraneous noise appearing in the sound output of an amplitude modulation broadcast receiver of the order of 10 to 1, i. e., with a desired signal of 1 volt, the noise output was 10 volts with the conventional single detector, but noise output was only 1 volt with the balanced detector circuit shown in the figure.

While I have shown and described a present preferred embodiment of my invention, it will be understood that numerous variations and modifications may be made, and I contemplate, in the appended claims, to cover any equivalent variations and modifications as fall within the true spirit and scope of my disclosure.

What I claim as new and desire to secure by Letters Patent of the United States is:

1. In an amplitude-modulation receiver of the superheterodyne type, means for obtaining an output signal substantially free of extraneous noise comprising an intermediate-frequency amplifier tuned to amplify a first predetermined frequency and to amplify signals extending over a predetermined frequency band including said frequency, a balanced frequency discriminator circuit comprising an input circuit coupled to said amplifier and tuned to a second predetermined frequency also lying within said band but different from said first frequency, said discriminator circuit including a pair of rectifiers having opposed output load impedances, said discriminator being constructed and arranged to produce unidirectional output voltages across said impedances of opposite polarities and of differentially-varying magnitudes in response to signals impressed on said input circuit, said voltages being equal for voltages of said second predetermined frequency, means for impressing an amplitude-modulated intermediate-frequency carrier wave on said amplifier, said carrier wave having said first predetermined frequency, a modulation-frequency signal amplifier having an input circuit, and means differentially coupling both said load impedances to the input circuit of said signal amplifier so as to impress said detected output voltages thereon in opposition.

2. A noise-reducing demodulating circuit for an amplitude-modulation radio receiver of the type having means for converting a received carrier wave into a wave of a first predetermined intermediate frequency, comprising a channel for amplifying said intermediate frequency wave, said channel having a frequency response extending over a band including said frequency, a balanced frequency discriminator connected to said channel and tuned to a second predetermined frequency lying within said band, said discriminator having a pair of opposed output load impedances and being constructed and arranged to produce a unidirectional output voltage having polarity and magnitude respectively dependent on the direction and magnitude of the deviation in frequency of applied waves from said second predetermined frequency, said second frequency differing from said first frequency, an amplifier coupled to both said output load impedances for amplifying said output voltage, and means for rendering said amplifier operative when said voltage is of one polarity and inoperative when of opposite polarity, whereby only the output voltage of said one polarity is amplified.

3. A noise reducing demodulating circuit for an amplitude modulation radio receiver of the type having means for converting a received carrier wave into an intermediate frequency wave, comprising a channel for amplifying said intermediate frequency wave, said channel having a substantially uniform response over a predetermined range of frequencies, a balanced frequency discriminator circuit connected to said channel, said circuit having primary and secondary windings tuned to a selected frequency within said range and having a fixed bandwidth, said intermediate frequency differing from said selected frequency but occurring within said range and within said bandwidth, said circuit including a pair of rectifiers connected to said secondary winding and having unlike poles connected together through a pair of resistances whose junction is connected to a common point in said circuit, an impedance connected between said common point and the midpoint of said secondary winding, and means for impressing voltage from said primary winding on said point, whereby said intermediate frequency wave produces at said unlike poles unidirectional voltages of opposed polarity and unequal magnitudes varying in accordance with said amplitude modulation, an amplifier having a connection to said common point and having a signal input terminal, a polarity sensitive amplification control terminal, and a signal output terminal, said signal input terminal being connected by a pair of impedances to said unlike poles, said control terminal being connected to said unlike poles by a pair of impedances, said impedances passing low frequency and unidirectional components only to control the amplification of said amplifier in accordance with the polarity of said unidirectional voltages.

ROBERT B. DOME.

REFERENCES CITED

The following references are of record in the file of this patent:

UNITED STATES PATENTS

| Number | Name | Date |
|---|---|---|
| 1,559,743 | De Bellescize | Nov. 3, 1925 |
| 2,121,103 | Seeley | June 21, 1938 |
| 2,176,218 | Klutke | Oct. 17, 1939 |
| 2,204,954 | Anderson et al. | June 18, 1940 |
| 2,227,415 | Wolff | Dec. 31, 1940 |
| 2,290,517 | Wilson | July 21, 1942 |
| 2,361,625 | Hansell | Oct. 31, 1944 |
| 2,362,806 | Dome | Nov. 14, 1944 |
| 2,497,103 | Toth | Feb. 14, 1950 |

FOREIGN PATENTS

| Number | Country | Date |
|---|---|---|
| 552,807 | Great Britain | Apr. 27, 1943 |
| 4,125 | Great Britain | Nov. 4, 1909 |

OTHER REFERENCES

Tuning Indicators and Circuits for Frequency-Modulation Receivers by Rodgers; Pro. IRE March 1943, pages 89 to 93.